WEB TRANSPORT

Filed March 26, 1963

4 Sheets-Sheet 1

INVENTOR.
MICHAEL E. MIKRUT

BY Fed Sullivan

ATTORNEY

Feb. 15, 1966 M. E. MIKRUT 3,235,264

WEB TRANSPORT

Filed March 26, 1963 4 Sheets-Sheet 2

INVENTOR.
MICHAEL E. MIKRUT

BY [signature]

ATTORNEY

Feb. 15, 1966 M. E. MIKRUT 3,235,264

WEB TRANSPORT

Filed March 26, 1963 4 Sheets-Sheet 3

INVENTOR.
MICHAEL E. MIKRUT

BY F. J. Sullivan

ATTORNEY

Feb. 15, 1966 M. E. MIKRUT 3,235,264

WEB TRANSPORT

Filed March 26, 1963 4 Sheets-Sheet 4

INVENTOR.
MICHAEL E. MIKRUT

BY [signature]

ATTORNEY

United States Patent Office 3,235,264
Patented Feb. 15, 1966

3,235,264
WEB TRANSPORT

Michael E. Mikrut, Littleton, Mass., assignor to Sylvania Electric Products Inc., a corporation of Delaware
Filed Mar. 26, 1963, Ser. No. 271,040
14 Claims. (Cl. 274—11)

Figures 1A, 1B, 1C, 1D, 1E, 1F:
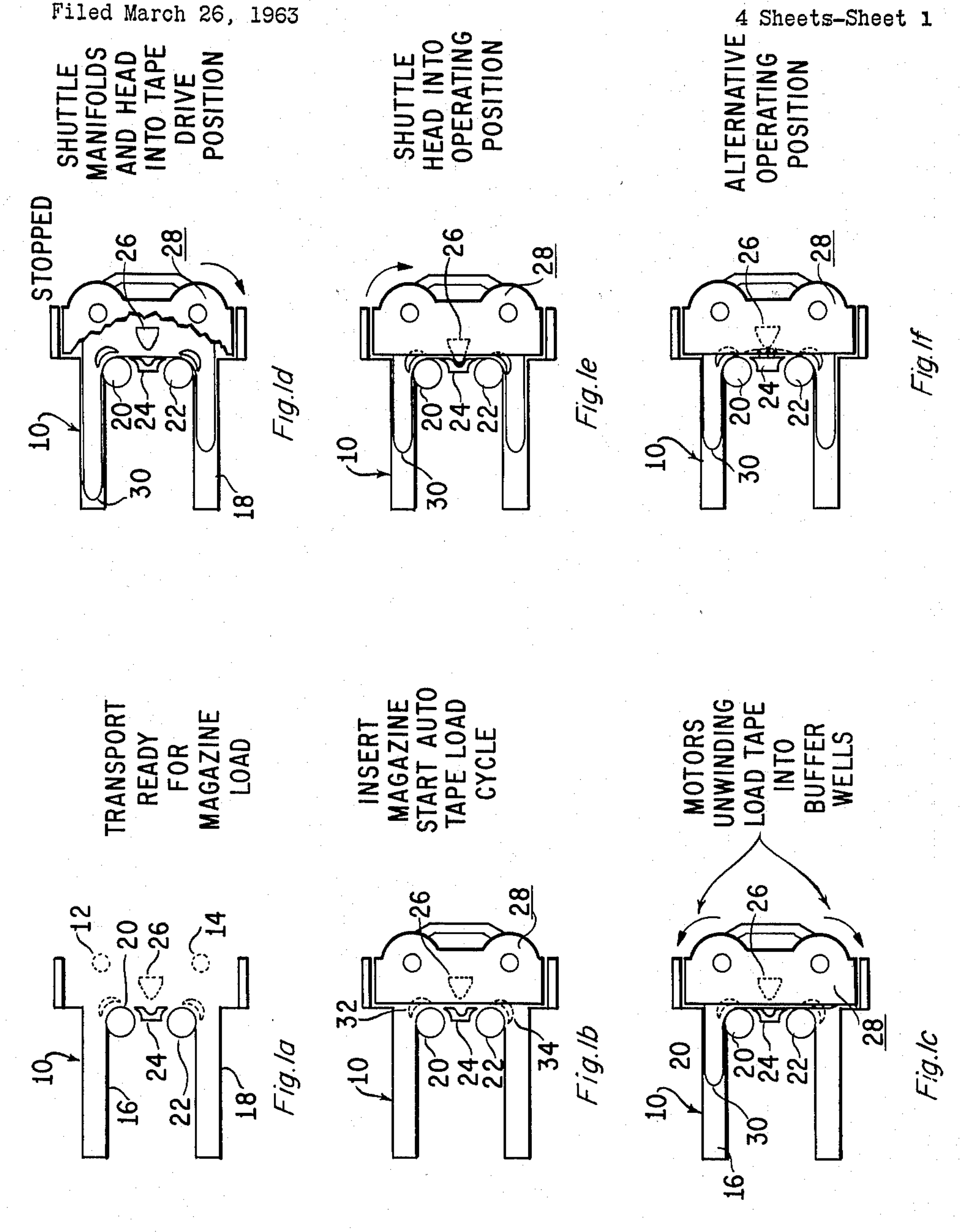

This invention is concerned with web transport mechanisms and particularly with automated loading of magnetic tapes into transport equipment.

Present tape transporting mechanisms feature the following basic components: a pair of storage reels, a pair of tape-driving capstans, a tape brake, a pair of vacuum wells, and a read-write head. One storage reel is arranged for feeding tape and the other for collecting it after the read or write operation which is performed by the head actuated by appropriate electronics. Since the reels for storing the tape are of relatively high mass, inertia problems are encountered when it is desired to start or stop their operation. Consequently, vacuum wells are usually provided to store the tape before it is passed from the feeding reel to the first capstan and after it has passed the second capstan en route to the take-up reel. These vacuum wells hold an adequate length of tape, so that the effect of a fast start or stop is buffered by the take up of slack in the vacuum wells, thus avoiding the effect of the inertia of the reels.

Loading of the tape is presently accomplished by fitting a magazine holding the reels to the drive motor spindles. Next, the tape is unwound by hand into the vacuum wells, over the capstans, and over the head, which is on the same side of the tape as the capstans. However, since the head must be proximate the oxide side of the tape, the capstans are also and the contact between oxide and the capstans eventually wears away the oxide or destroys data recorded thereon.

Another frequently used transport apparatus has the head on the opposite side of the tape from the capstans, thereby requiring the insertion of a tape magazine, hand threading to the vacuum wells and over the capstans, and further hand threading under the head. This hand threading under the head further increases the chances of mutilation of the tape and its oxide surface due to excessive human handling. The choice, then, is between the problem of capstan wear versus hand wear, or to devise a method for avoiding both.

Accordingly, a primary object of the present invention is to provide improvements in web-transporting techniques and equipments. Another object is to provide an automated means for loading magnetic tape into transport equipment.

These and other objects of the invention are accomplished in one illustrative embodiment which features a technique for inserting a cartridge or magazine containing tape reels into a tape transporting machine and a pneumatic method and apparatus for drawing tape from the magazine and shuttling the read-write head and transport mechanism so that the machine can accommodate the magazine and the tape.

Figure 2:
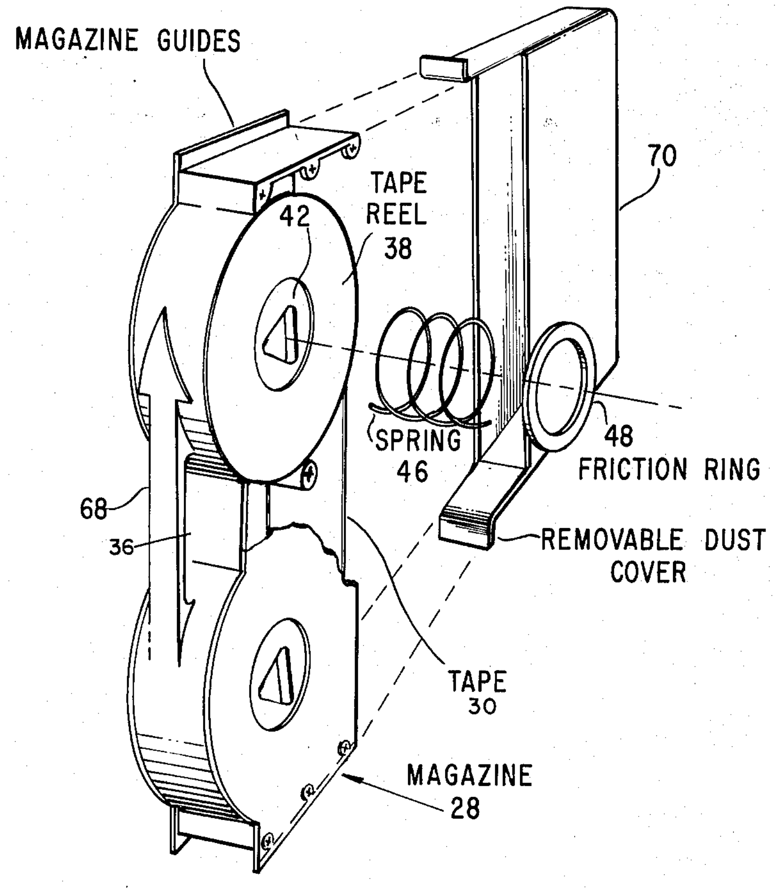
Figures 3A, 3B, 3C:
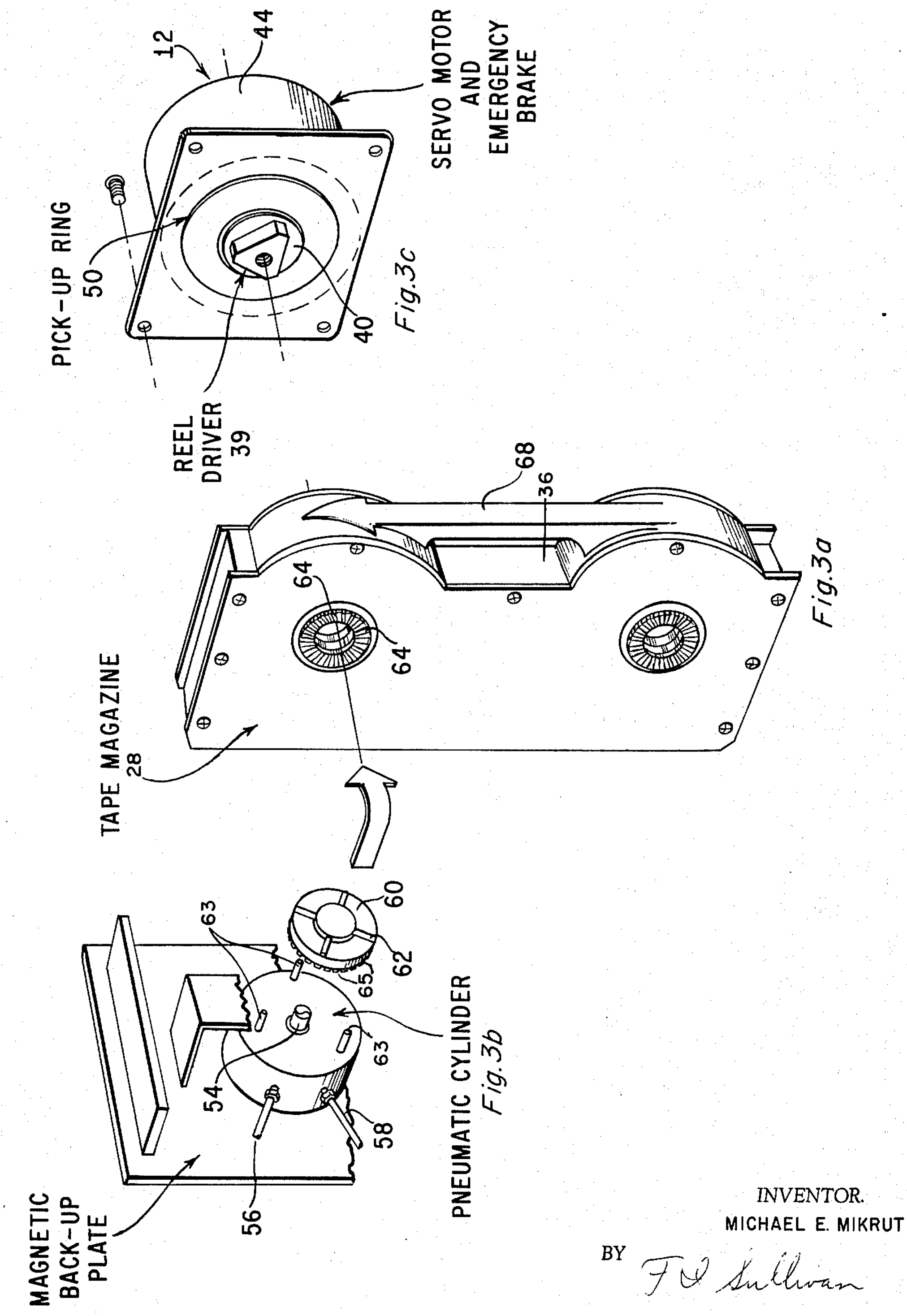
Figure 4:
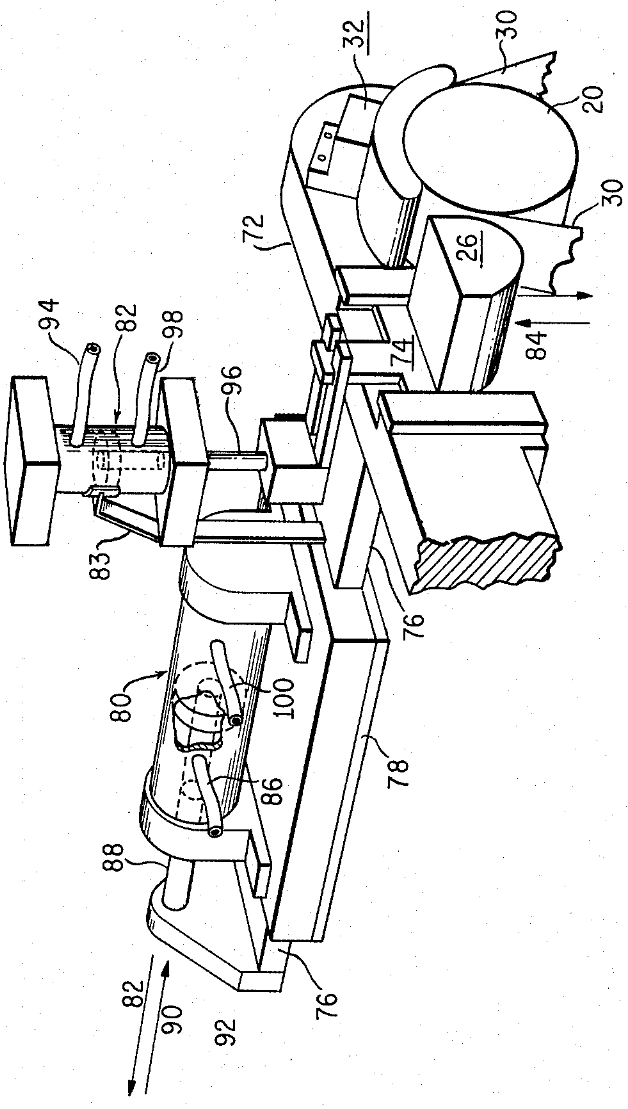

The structure and operation of this tape transport and other features, embodiments and modifications of the invention will be apparent from the following description and reference to the accompanying drawings, wherein:

FIGS. 1*a*–1*e* are a series of diagrammatic views of a magnetic tape transport mechanism showing various operating steps for practicing the invention;

FIG. 1*f* shows an alternative technique for holding a magnetic tape to a read-write head;

FIG. 2 is an exploded perspective view of a magazine loader for magnetic tape transport equipment as viewed from the right;

FIG. 3*a* is a perspective view of the magazine of FIG. 2 as viewed from the left;

FIG. 3*b* is a perspective view of a portion of the driving mechanism for the tape reels of the magazine of FIGS. 2 and 3*a*;

FIG. 3*c* is a perspective view of another portion of the driving mechanism; and, FIG. 4 is a perspective view of a head and manifold shuttling mechanism embodying the invention.

*General description*

The tape transport apparatus 10 shown, diagrammatically, in various operating positions in FIGS. 1*a*–1*e* is comprised principally of reel drives 12 and 14, tape buffer wells 16 and 18, tape driving capstans 20 and 22, a tape brake 24, and a read-write head 26. A magazine 28 containing two tape winding reels is arranged to be inserted into the transport equipment 10, and the tape 30 which is carried by the reels is drawn from the magazine into the buffer wells 16 and 18 and across the capstans 20 and 22 so that it is engageable by the brake 24 and the read-write head 26.

Although the magazine and automatic tape loading features of the embodiment of the invention under description are useful with many types of magnetic tape handlers and web transports, for the purposes of the present explanation it will be assumed that it is operating with a magnetic tape transport of the type described in copending U.S. patent application Serial No. 199,740, filed by R. H. Davison, J. G. Simon, and J. O. Esselstyn on June 4, 1962, now Patent No. 3,122,295, and assigned to Sylvania Electric Products Inc. For purposes of the following explanation, however, a brief description of the structure and operation of the apparatus described therein is sufficient.

Referring to the diagrams of FIGS. 1*a*–1*e*, a magnetic tape 30 is threaded over a brake 24, under a read-write head 26, and thence, in either direction, through a tape transport passage defined by the clearance between a constantly rotating capstan 20 or 22 and a companion air exhaust manifold 32 or 34. The two capstans rotate in opposite directions. Consequently, the direction of motion past the head 26 is controlled by selectively exhausting air under pressure from one or the other of the manifolds 32 and 34. The operation of reel drives 12 and 14 is coordinated with the selective pulsing of the exhaust manifolds so that the reels within the magazine 28 are turned in the proper direction to either play out or take up tape and, as explained in the introductory remarks to this specification, buffer wells 16 and 18 are employed to provide a slack loop in the tape between the driving capstans and the reels to overcome inertia delays in start and stop operations.

The basic steps involved in inserting a tape-loaded magazine 28 into transport equipment 10 are diagrammed in FIGS. 1*a*–1*e*.

FIG. 1*a* shows the transport equipment 10 ready for a tape magazine 28 to be inserted into it. Read-write head 26 and the manifolds 32 and 34 are withdrawn in a direction below the surface plane of the figure so that the tape within an inserted magazine 28 may be moved past them to a location immediately adjacent the surfaces of the capstans 20 and 22 and the brake 24.

FIG. 1*b* shows the magazine 28 inserted into the transport mechanism 10.

FIG. 1*c* shows a loop of tape being drawn, by vacuum pressure, out of the magazine 28 and into the buffer well 16.

FIG. 1*d* shows a second loop of the tape 30 similarly drawn into the buffer well 18 with the read-write head 26 and manifolds 32 and 34 shuttled back into the same plane as the capstans 20 and 22 and the brake 24, behind the tape 30 so that it is enclosed within the passage between the capstans and the manifolds.

FIG. 1*e* shows the apparatus ready for read-write operation. Loops of tape 30 have been drawn, in substantially equal balance, into the buffer wells 16 and 18, and the read-write head 26 has been moved laterally (in the plane of the figure) so that it has come into contact with the tape 30.

Instead of moving the head 26 against the tape 30 to establish signal transducing contact, the tape may be urged against the head my pneumatic pressure in the manner shown in FIG. 1*f*. Such pressure may be established by air pressure from the brake or other source adjacent the head or by vacuum applied to the head housing.

Specific structural details of the magazine 28 and the mechanism for shuttling the manifolds and the read-write head will now be described.

*Tape magazine*

The magazine 28 shown in perspective in FIGS. 2 and 3*a* is comprised of a housing 36 containing two reels, one of which appears at 38 in FIG. 2, each mounted for rotational drive by a triangular-shaped protrustion 39 on a shaft 40 (FIG. 3*b*) which is engageable with a similar shaped recess in the hub 42 of the reel. Shaft 40 is driven by a servo motor and brake unit 44 in the reel driving unit 12. Thue hub 42 is slidable along the central axis of the reel 38, and a coil spring 46 inserted between the hub 42 and a friction ring 48 engageable with a ridge 50 on the shaft 40 normally holds the hub 42 away from the triangular protuberance 39 and prevents the reel from being driven.

A pneumatic cylinder 52 (FIG. 3*b*) is arranged to project or retract a piston shaft 54 by selectively applying air under pressure to a projecting or retracting air line shown at 56 and 58, respectively. The movement of this piston is imparted to a plate 60 which has ribs 62 engageable with recesses 64 in the slidable hub 42. Thus, when the piston 54 is projected it pushes plate 60 into engagement with hub 42 and thus moves the hub against the force of spring 46 into engagement with its drive shaft 40. Spring-loaded pins 63 lock into grooves 65 on the plate 60 and hold the hub 42 from rotating until the combination of lateral pressure from shaft 54 and the rotation of shaft 40 causes the triangular protuberance 39 on rotating shaft 40 to seat into the mating recess in stationary hub 42. The resulting extra lateral movement of hub 42 moves grooves 65 beyond the reach of pins 63 and permits the reel 38 to be driven in the direction of rotation of servo motor 44.

A handle 68 is provided at the rear of the magazine 28 and a removable cover 70 is provided for the front opening to protect the tape 30 from contamination and physical damage during storage. The back wall of the magazine is open, as shown in FIG. 2, to provide clearance for the shuttling of the head and manifold and to allow the tape 30 to be withdrawn therefrom.

*Head and manifold shuttling*

The head and manifold shuttling apparatus shown in FIG. 4 comprises a supporting plate 72 to which the manifolds 32 and 34 (latter not shown) and a slidable support 74 are secured, a slide 76 to which the plate 72 is attached, a fixed frame 78 which supports the slide 76 and provides bearing surfaces for permitting a reciprocating motion of the slide, a horizontal pneumatic cylinder 80 supported on frame 78 for moving the slide 76, and a vertical cylinder 82, also supported by frame 78 by a bracket 83, for moving the head support 74 also supported by frame 78, via a bracket 83.

Before the magazine 28 is inserted, the plate 72 is in its withdrawn position in direction 85. Because the head 26 and manifolds 32 and 34 (latter not shown) are affixed to this plate, they are also withdrawn, and the head 26 is in its uppermost position 84 at that time. When the tape 30 is drawn into wells and across the capstans and it is desired to operate the mechanism, air under pressure is inserted to the horizontal cylinder 80 through inlet port 86. This causes piston 88 to move forward in direction 90. Plate 92 connecting piston 88 to slide 76 is moved in the same direction, causing slide 76 also to move forward in the direction 90. This brings plate 72 forward with its attached manifolds 32 and 34 and head 26, so that the manifolds cover the tape 30 on the capstans 20 and 22. Thereupon, air under pressure is applied to inlet port 94 causing piston 66 in vertical cylinder 82 to be lowered This action of the piston 96 lowers the head 26 to its operative position When it is desired to unload the transport, air under pressure is applied to inlet port 98 in cylinder 82 causing the piston 96 to rise, thereby lifting the head 26 from its operative position Air under pressure is then applied to inlet port 100 in cylinder 80 causing the plate 72 and therefore the head 26 and manifolds 32 and 34 to withdraw.

This pneumatic operation of the head and manifold shuttling mechanism is simplified by the convenient availability of the same pressurized air source applied to the manifolds 32 and 34 to drive the tape 30.

*Operation*

The operation of the illustrative embodiment of the invention which has been shown and described may be summarized as follows with reference to FIGS. 1*a*–1*e*.

With the Main Power switch (not shown) of the equipment 10 in ON position, the alternating and direct current power supplies and the air pressure source are all energized. It may be assumed that FIG. 1*a* represents this condition of the equipment with manifolds 32 and 34 and head 26 withdrawn.

When a magazine 28 is inserted into the equipment 10, as shown in FIG. 1*b*, a Load-Operate switch (not shown), which may be located on a control panel or be closed by the magazine 28 itself as it is inserted, causes the reels 38 to be coupled to their respective drives. The tape 30 is then drawn into one of the vacuum wells 16 or 18 at a time (FIG. 1*c*) with the brake 24 being employed to prevent pulling the tape from one well to the other. Then, the manifolds 32, 34 and head 26 are shuttled forward (FIG. 1*d*) to complete the tape threading operation, and thus the tape 30 has been located between the capstans 20, 22 and the manifold. The head 26 is then moved to operating position along its second axis of motion parallel to the length of the tape wells (FIG. 1*e*). Unload is accomplished by activating an Unload switch (not shown), which causes the head 26 to move upward along its second axis of motion parallel to the length of the tape wells. The manifolds and head are then withdrawn and the tape is pulled back from the tape wells by winding motion of the reels. The magazine may then be withdrawn after the coupling between the reels and the reel drive motors is released.

Although the invention has been shown and described with reference to one particular embodiment, it is not limited to the specifics of this description but embraces the full scope of the following claims.

What is claimed is:

1. Magnetic tape transport apparatus comprising, in combination, a support, first and second spaced apart tape driving capstans rotatably mounted on said support, first and second pneumatic manifolds respectively normally supported proximate said first and second capstans to define a tape transport passage therebetween, a transducer head normally supported between said capstans in signal transducing proximity with a tape transported through said passage, means for moving said manifolds out of passage defining position and said head out of signal transducing position, means operative while said manifolds and head are moved out of said passage defining position and signal transducing position, respectively, to thread a loop of tape through said passage and over said capstans, and means operative when said tape has been threaded to return said manifolds to passage defining position and said transducer into signal transducing proximity with said tape.

2. Magnetic tape transport apparatus comprising, in combination, a magazine having first and second tape reels rotatably supported therein, each having a portion of a continuous length of tape wound thereon, a support, first and second tape-driving capstans rotatably mounted on said support, first and second pneumatic manifolds respectively supported proximate said first and second capstans and therewith defining a tape transport passage, a magnetic transducer head normally supported in the plane of said passage in signal transducing proximity with a tape transported through said passage between said capstans, means for moving said manifolds and said head out of passage defining position and said plane, respectively, means detachably mounting said magazine on said support to position a length of tape extending between said first and second reels in said passage while said manifolds and head are respectively out of said position and plane, means for drawing said last-mentioned length of tape over said capstans, and means for returning said manifolds and said head to said position and plane, respectively, after said tape has been drawn over said capstans.

3. Magnetic tape transport apparatus comprising, in combination, a supporting frame, first and second tape-driving capstans rotatably supported on said frame, means on said frame for rotating said capstans in opposite directions, a slide reciprocably mounted on said frame for movement in a direction parallel to the axes of said capstans, first and second pneumatic manifolds secured to said slide and movable therewith between a first position where they define with said capstans a tape transport passage and a second position removed from said passage defining position, a signal transducing head supported on said slide and movable therewith from an operative position in signal transducing proximity with a tape transported through said passage and an inoperative position removed from said passage, a brake supported on said frame in a position to coact with said head while in said operative position to exert a drag force on a tape transported through said passage, a tape magazine having first and second tape reels rotatably supported therein, each having a portion of a continuous length of tape wound thereon, first and second tape buffer wells supported on said frame adjacent said first and second capstans, respectively, means for selectively moving said slide to move said manifolds from said first to said second position and said head from said operative to said inoperative position, and vice versa, means detachably supporting said magazine adjacent said capstans to position a length of tape extending between said reels proximate said capstans and said brake, and means operative when said manifolds and head are in said second and inoperative positions, respectively, for drawing tape from said reels over said capstans and into said wells.

4. Apparatus in accordance with claim 3 further including means for urging the tape transported through said passage toward said signal transducing head when in said operative position.

5. Apparatus in accordance with claim 4 wherein said means for moving said tape comprises apparatus for creating a differential in air pressure between the two sides of the tape.

6. Apparatus in accordance with claim 5 wherein said brake is located on the side of the tape opposite said signal transducing head when in said operative position and comprises a member having an apertured braking surface and means for applying a vacuum to said apertures, and said means for urging the tape toward said head comprises a source of air under pressure and means for releasing said air through said apertures against the tape.

7. For transporting a magnetic tape having a relatively sensitive surface on one side and a relatively durable surface on the opposite side and transducing signals between a magnetic transducing head and said sensitive surface, apparatus comprising: first and second counter-rotating tape-driving capstans, first and second air exhaust manifolds normally supported proximate said first and second capstans, respectively, to define therewith a tape transport passage, a source of air under pressure connected to said manifolds, means for withdrawing said manifolds from passage defining position to provide access for insertion of a length of tape into said passage, said tape being inserted with its durable surface against said capstans and its sensitive surface facing said manifolds, means for returning said manifolds to said passage defining position when said tape has been so inserted, means for selectively exhausting air from said source through said manifolds against the sensitive surface of said tape to move the durable surface thereof into driving engagement with one or the other of said capstans, a magnetic signal transducing head normally supported in the plane of said passage in signal transducing proximity with the sensitive surface of a tape transported therethrough, and means for moving said head out of the plane of the passage when it is desired to thread said tape to said capstans.

8. Magnetic tape transport apparatus comprising, in combination, a magazine in which first and second tape reels are rotatably supported in a common plane with their axes parallel to each other, a length of tape having a relatively sensitive magnetizable surface and a relatively durable surface, first and second portions of which are wound on said first and second reels with the sensitive surface facing the axes of the reels, first and second spaced apart counter-rotating tape-driving capstans, means adjacent said capstans defining with said capstans a passage for said tape along a line lying between said capstans, first and second tape buffer wells supported adjacent said first and second capstans, respectively, means supporting said magazine to position a length of tape between said first and second reels along the line of said passage, means for driving said tape reels in rotation, means for drawing first and second loops of said tape from said reels over said capstans and into said first and second buffer wells, respectively, pneumatic means for selectively urging said durable surface of said tape against one or the other of said oppositely rotating capstans to transport said tape in one direction or the other through said passage, and a magnetic signal transducing head removably supported in magnetic signal transducing proximity with said sensitive surface of said tape within said passage.

9. Magnetic tape transport apparatus comprising, in combination, a support, first and second tape driving capstans rotatably mounted on said support with their axes parallel to each other, means for driving said capstans in opposite directions, a slide member mounted on said support for back and forth movement in a direction parallel to the axes of said capstans, first and second pneumatic manifolds supported on said slide member and normally positioned proximate a respective one of said capstans to define a tape transport passage between said capstans and manifolds, a transducer head supported on said slide member and normally positioned in the plane of said passage in signal transducing proximity with a tape transported through said passage, means connected to said slide member and operative selectively to move said manifolds out of passage defining position and said head out of the plane of said passage to allow a loop of tape to be threaded over said capstans, and to return said manifolds to passage defining position and said head into signal transducing proximity with said web material after said tape has been threaded.

10. Magnetic tape transport apparatus comprising, in combination, a support, first and second counter-rotating tape-driving capstans rotatably mounted on said support in a common plane with their axes parallel to each other, a slide member mounted on said support for reciprocal movement in a first direction parallel to the axes of said capstans, first and second pneumatical manifolds supported on said slide member and normally positioned proximate said first and second capstans, respectively, to define therewith a tape transport passage, a signal transducing head supported on said slide for reciprocal movement therewith and for reciprocal movement in a second direction normal to said first direction and normally positioned in the plane of said passage, means for moving said slide to move said manifolds out of passage defining position, means for moving said head in said second direction out of the plane of said passage, means operative when said manifolds and head are moved out of passage defining position and said plane, respectively, to thread a length of tape over said capstans, and means operative when said tape has been threaded to return said manifolds and said head to their normal positions.

11. Apparatus in accordance with claim 10 further inincluding a magazine having first and second tape reels rotatably supported therein on which first and second portions of said tape are wound, the aforesaid length thereof extending between said first and second reels, and means operative when said manfolds and heads are moved out of passage refining position and said plane, respectively, to detachably secure said magazine to said support to position said length of tape in said passage.

12. Apparatus in accordance with claim 11 wherein said tape has a relatively sensitive surface on one side and a relatively durable surface on the other side and is wound on said reels with the sensitive surface facing the axes of said reels whereby the durable surface thereof faces said capstans.

13. Apparatus in accordance with claim 12 further including a source of air under pressure connected to said manifolds, and means for selectively exhausting air from said source through said manifolds against the sensitive surface of said tape to move the durable surface thereof into driving engagement with one or the other of said capstans.

14. Tape transport apparatus comprising, in combination, a magazine having first and second reels rotatably supported therein, each having a portion of a continuous length of tape wound thereon, a support, first and second capstans rotatably mounted on said support, first and second pneumatic manifolds respectively supported proximate said first and second capstans and therewith defining a tape transport passage, means for moving manifolds in a direction parallel to the axes of said capstans out of passage defining position, means detachably mounting said magazine on said support to position a length of tape extending between said first and second reels in said passage while said manifolds are out of said passage defining position, means for drawing said last-mentioned length of tape over said capstans, and means for returning said manifolds to said position after said tape has been drawn over said capstans.

References Cited by the Examiner

UNITED STATES PATENTS

| | | | |
|---|---|---|---|
| 2,941,739 | 6/1960 | Burke et al. | 242—55.12 |
| 2,941,741 | 6/1960 | Bilsback | 242—55.13 |
| 3,122,295 | 2/1964 | Davison et al. | 226—50 |

FOREIGN PATENTS

| | | |
|---|---|---|
| 916,739 | 1/1963 | Great Britain. |

NORTON ANSHER, *Primary Examiner.*